United States Patent
Yamamoto et al.

[11] Patent Number: 6,069,105
[45] Date of Patent: May 30, 2000

[54] ALUMINA-BASED SINTERED MATERIALS AND PROCESS FOR PRODUCING THE SAME

[75] Inventors: Yoshihiro Yamamoto, Aichi; Katsura Matsubara, Iwakura; Toru Shimamori, Kani; Iazuhisa Itakura, Komaki; Ken-ichi Mizuno, Nagoya, all of Japan

[73] Assignee: NGK Spark Plug Co., Ltd., Aichi, Japan

[21] Appl. No.: 09/283,979

[22] Filed: Apr. 1, 1999

[30] Foreign Application Priority Data

Jul. 14, 1998 [JP] Japan ................................ 10-216481

[51] Int. Cl.⁷ .......................... C04B 35/101; H01P 7/10
[52] U.S. Cl. ........................ 501/153; 501/109; 501/119; 501/128; 333/219.1
[58] Field of Search .................... 501/109, 119, 501/128, 153; 333/219.1

[56] References Cited

U.S. PATENT DOCUMENTS

| | | | |
|---|---|---|---|
| 4,582,813 | 4/1986 | Kanda et al. | 501/128 |
| 4,601,991 | 7/1986 | Ando et al. | 501/153 |
| 5,097,238 | 3/1992 | Sato et al. | 333/219.1 |
| 5,136,270 | 8/1992 | Hatanaka et al. | 333/219.1 |
| 5,424,257 | 6/1995 | Schat et al. | 501/127 |
| 5,753,893 | 5/1998 | Noda et al. | 219/548 |

FOREIGN PATENT DOCUMENTS

| | | | |
|---|---|---|---|
| 60-21854 | 2/1985 | Japan | C04B 35/10 |
| 60-151275 | 8/1985 | Japan | C04B 35/10 |
| 61-44757 | 3/1986 | Japan | C04B 35/10 |
| 2-1110-B | 1/1990 | Japan | C04B 35/10 |
| 2-150808 | 12/1990 | Japan | H01P 7/10 |
| 3-44311 | 4/1991 | Japan | H01P 7/10 |
| 6-16469 | 1/1994 | Japan | C04B 35/10 |
| 9-61714 | 3/1994 | Japan | H01P 7/10 |

OTHER PUBLICATIONS

Database WPI, Week 8615, Derwent Publications Ltd., AN 86–098575 XP002115426 & JP 61 044757 A, Mar. 4, 1986 (Abstract).

Database WPI Week 8538, Derwent Publications Ltd., AN 85–233151 XP002115427 & JP 60 151275 A, Aug. 9, 1985 (Abstract).

Database WPI, Week 8511, Derwent Publications Ltd., AN 85–065829 XP002115428 & JP 60 021854 A, Feb. 4, 1985 (Abstract).

*Primary Examiner*—David Brunsman
*Attorney, Agent, or Firm*—Sughrue, Mion, Zinn, Macpeak & Seas, PLLC

[57] ABSTRACT

Disclosed is an alumina-based sintered material comprising a magnesium component, a calcium component, a silicon component, and a lithium component, wherein the content of the lithium component in terms of oxide amount is from 0.002 to 0.04% by weight based on the alumina-based sintered material.

10 Claims, 1 Drawing Sheet

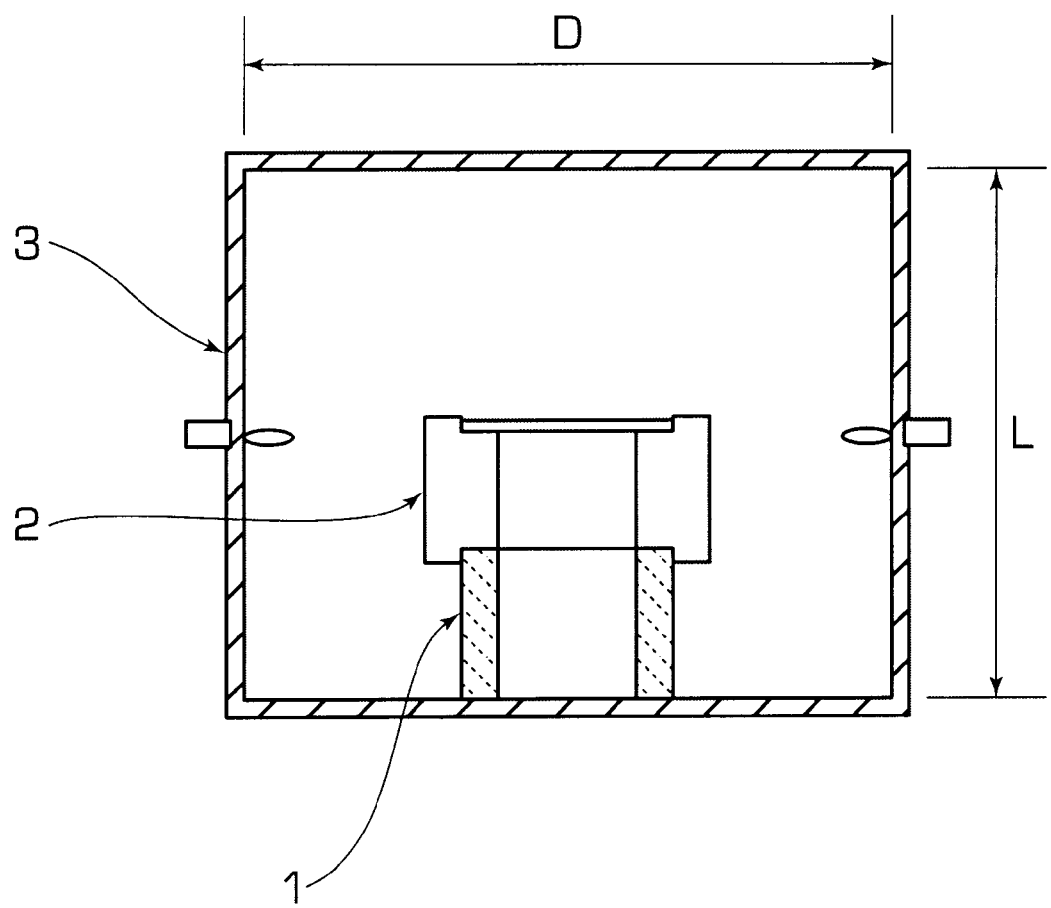
FIGURE

ALUMINA-BASED SINTERED MATERIALS AND PROCESS FOR PRODUCING THE SAME

FIELD OF THE INVENTION

The present invention relates to an alumina-based sintered material and a process for producing the same. The alumina-based sintered material of the present invention is obtained through burning at a relatively low temperature (e.g., 1550° C. or lower), has a high value of unloaded Q (hereinafter referred to simply as $Q_u$) and excellent thermal conductivity, and is useful, e.g., as a supporting base for a porcelain dielectric resonator.

BACKGROUND OF THE INVENTION

Dielectrics having excellent high-frequency characteristics in the microwave region have been developed, and resonators employing these dielectrics are in use. However, there are cases where even a resonator employing a material having excellent dielectric characteristics cannot take full advantage of the excellent performances inherent in the dielectric material, depending on the method for fabricating the porcelain dielectric resonator employing the dielectric material as the resonator main body, the structure of the resonator, etc., and is hence reduced in dielectric characteristics rather than improved. For example, the currently extensively used porcelain dielectric resonators comprising a resonator main body fixed to the inside of a metal casing (electric-magnetic, shield case) through a supporting base have a problem that the porcelain dielectric resonator including the supporting base and the metal case as a whole may have a reduced value of $Q_u$ depending on the dielectric characteristics of the supporting base, the kind and thickness of the glazing material, adhesive, or the like used for bonding the resonator main body to the supporting base, and other factors.

It is therefore desirable to employ a supporting base which itself has a $Q_u$ as high as possible. Furthermore, since the supporting base functions also to transmit the heat generated by the resonator main body to the metal casing, it preferably further has excellent thermal conductivity. In alumina-based sintered materials, the thermal conductivity thereof tends to increase as the $Al_2O_3$ content increases. A desirable supporting base is constituted of a material having an $Al_2O_3$ content of 99% by weight or higher.

With respect to the production of general alumina-based sintered materials, techniques of using a lithium ingredient as a sintering aid are disclosed in, e.g., JP-A-60-21854, JP-A-60-151275, and JP-A-61-44757. (The term "JP-A" as used herein means an "unexamined published Japanese patent application".) However, the techniques disclosed in those references differ from the process of the present invention in the sintering aids used in combination with the lithium ingredient. The alumina porcelains described in JP-A-60-151275 and JP-A-61-44757 each has an $Al_2O_3$ content of 96% by weight at the most. Furthermore, in JP-A-60-21854, there is especially no description concerning an improvement in the thermal conductivity of the sintered material, although the sintered material has a high $Al_2O_3$ content.

SUMMARY OF THE INVENTION

An object of the present invention, which eliminates the problem described above, is to provide an alumina-based sintered material which has a high $Q_u$ and excellent thermal conductivity and, in particular, is useful as a supporting base for a porcelain dielectric resonator. Another object of the present invention is to provide a process for producing this alumina-based sintered material from an $Al_2O_3$ powder having a low sodium component content and from sintering aids including a specific amount of a lithium compound through burning at a relatively low temperature.

In producing an alumina-based sintered material, sintering aids comprising magnesium, calcium, and silicon compounds can be used. These sintering aids accelerate sintering, whereby a lower burning temperature can be used. However, in order to obtain a sintered material having a heightened $Q_u$ value, the incorporation amounts of these sintering aids should be reduced. Investigations were hence been made on the use of other ingredients as sintering aids in combination with those compounds for the purposes of improving suitability for sintering and heightening $Q_u$. As a result, it has been found that the above objects are accomplished by incorporating a small amount of a lithium compound.

BRIEF DESCRIPTION OF THE DRAWING

FIG. 1 is a view of a dielectric resonator utilizing the alumina-based sintered material.

DETAILED DESCRIPTION OF THE INVENTION

The present invention provides, as described in a first embodiment, an alumina-based sintered material having a magnesium component, a calcium component, a silicon component, and a lithium component, wherein the content of the lithium component in terms of oxide amount is from 0.002 to 0.04% by weight based on the alumina-based sintered material.

If the amount of the "lithium component" which has not volatilized during burning and remains in the sintered material, i.e., which is contained in the sintered material, is smaller than 0.002% by weight in terms of oxide amount, the effects of the use of a lithium compound as one of sintering aids and of the resultant incorporation of a lithium component into the sintered material cannot be obtained. Namely, neither suitability for sintering nor $Q_u$ is improved sufficiently. On the other hand, if the content thereof exceeds 0.04% by weight, both suitability for sintering and $Q_u$ are reduced rather than improved, as compared with the case where no lithium component is contained. The content of the lithium component in terms of oxide amount is preferably from 0.003 to 0.04% by weight, more preferably about from 0.004 to 0.01% by weight. When the lithium component content is within the above range, an alumina-based sintered material having a higher $Q_u$ can be obtained.

As shown in a second embodiment, the amount of this lithium component is preferably "from 30 to 40% by weight" in terms of oxide amount based on the lithium compound which has been incorporated as a sintering aid. Namely, from 60 to 70% of the lithium compound incorporated as a sintering aid preferably volatilizes into the surrounding atmosphere during a burning step. That is, in the present invention, a large proportion of the lithium compound incorporated in a small amount as a sintering aid thus volatilizes while contributing to the acceleration of sintering and a small proportion thereof finally remains in the sintered material. Consequently, the resultant sintered material has improved denseness and a heightened $Q_u$.

The proportion of the lithium component contained in the sintered material to the lithium compound which has been incorporated as a sintering aid varies also depending on burning temperatures. Lower burning temperatures tend to result in reduced volatilization of the lithium compound into the surrounding atmosphere, while higher burning temperatures tend to result in accelerated volatilization. For example, when a burning temperature of 1,520° C. is used, the proportion of the lithium component remaining in the resultant sintered material is from 35 to 40% by weight. On the other hand, when a sintering temperature of 1,620° C. is used, the proportion thereof is from 30 to 40% by weight. This suggests that higher burning temperatures result in volatilization of a larger proportion of the lithium compound.

In the alumina-based sintered material of the present invention, the amount of $Al_2O_3$ is preferably "from 99.5 to 99.8% by weight" and the total amount of the magnesium, calcium, silicon, and lithium components in terms of oxide amount is preferably "from 0.2 to 0.5% by weight" both based on the alumina-based sintered material, as shown in a third embodiment. When the proportion of $Al_2O_3$ and that of the four other components are respectively in the above ranges, an alumina-based sintered material having a higher $Q_u$ can be obtained. The total amount of those four components is more preferably from 0.2 to 0.4% by weight, most preferably from 0.25 to 0.35% by weight. As long as the proportion of those components is within this range, burning can be conducted at a relatively low temperature without posing any problem, and alumina-based sintered materials having a high $Q_u$ can be stably obtained.

In the present invention, the amount of magnesium in terms of MgO is generally from 0.01 to 0.10% by weight based on the alumina-based sintered material. The amount of calcium in terms of CaO is generally from 0.02 to 0.15% by weight based on the alumina-based sintered material. The amount of silicon in terms of $SiO_2$ is generally from 0.05 to 0.35% by weight based on the alumina-based sintered material.

Unlike the lithium component content, the contents of $Al_2O_3$ and magnesium, calcium, and silicon components in the sintered material are respectively almost the same as the proportions, in terms of oxide amount, of the corresponding powders in the compact to be burned. Namely, in the present invention, all the components other than the lithium component hardly volatilize into the surrounding atmosphere during a burning step because of a relatively low burning temperature. Even the magnesium ingredient, which is relatively volatile among those sintering aids, remains substantially wholly in the resultant sintered material.

The sintered material preferably has a sodium component content of "up to 0.05% by weight" in terms of oxide amount based on the alumina-based sintered material, as shown in a fourth embodiment. Sodium component contents in the sintered material exceeding 0.05% by weight are undesirable in that the sintered material has a reduced $Q_u$. The sodium component content in the sintered material is preferably 0.01% by weight or lower. More preferably, the sintered material contains no sodium component, as shown in a fifth embodiment.

The present invention further provides, as described in a sixth embodiment, a process for producing an alumina-based sintered material which comprises using powdery compounds of magnesium, calcium, silicon, and lithium as sintering aids for a powder of $Al_2O_3$, wherein the amount of the lithium compound powder in terms of oxide amount is from 0.005 to 0.1% by weight based on the total amount of the $Al_2O_3$ powder and the sintering aids in terms of oxide amount.

In this process, the proportion of the $Al_2O_3$ powder is preferably regulated to 99.5 to 99.8% by weight. Even when such a high $Al_2O_3$ powder proportion is used, low-temperature sintering is accelerated due to the use of a lithium compound as one of the sintering aids, whereby a dense sintered material can be obtained. The $Al_2O_3$ powder does not undergo volatilization or the like during the burning step and substantially all the $Al_2O_3$ remains to constitute the resultant sintered material. Consequently, the alumina-based sintered material obtained can have an exceedingly high $Al_2O_3$ content and be excellent in both $Q_u$ and thermal conductivity.

Usable examples of the magnesium, calcium, and silicon compounds incorporated as sintering aids include the oxides of these elements, i.e., MgO, CaO, and $SiO_2$, carbonates such as $MgCO_3$ and $CaCO_3$, and hydroxides such as $Mg(OH)_2$ and $Ca(OH)_2$. Other usable examples of compounds of those elements include silicides such as $Mg_2Si$ and $Ca_2Si$, silicates such as calcium silicate, magnesium silicate, and magnesium calcium silicate, and calcium forsterite ($CaMgSiO_4$), which is a mineral containing such compounds in a high purity. Also usable are kaolinite, metakaolinite, mullite ($2Al_2O_3.SiO_2$, etc.), and spinel ($MgAl_2O_4$), which each is a mineral containing aluminum together with at least one of magnesium, calcium, and silicon.

If the amount of a lithium compound incorporated as a sintering aid is smaller than 0.005% by weight in terms of oxide amount, the effects of use of the lithium compound as one of the sintering aids cannot be obtained. Namely, neither suitability for sintering nor $Q_u$ is improved sufficiently. On the other hand, if the incorporation amount thereof exceeds 0.1% by weight in terms of oxide amount, both suitability for sintering and $Q_u$ are reduced rather than improved, as compared with the case where no lithium compound is incorporated. The incorporation amount of a lithium compound used as a sintering aid is more preferably from 0.01 to 0.1% by weight, most preferably from 0.01 to 0.03% by weight, in terms of oxide amount. When the incorporation amount of the lithium compound is within the above range, burning can be conducted at a relatively low temperature and an alumina-based sintered material having a higher $Q_u$ can be obtained.

The $Al_2O_3$ powder preferably has a sodium component content of up to 0.07% by weight, as shown in a seventh embodiment. By using the $Al_2O_3$ powder having such a reduced sodium content as a starting material, the sintered material obtained through burning can have a reduced sodium component content as described above. The sodium component content in the $Al_2O_3$ powder is more preferably 0.05% by weight or lower. Most preferably, the $Al_2O_3$ powder contains no sodium component, as shown in an eighth embodiment.

The lithium compound incorporated as a sintering aid is preferably at least one member selected from the oxide, hydroxide, and carbonate of lithium and water-soluble lithium salts of organic acids, as shown in a ninth embodiment. Examples of the water-soluble lithium salts of organic acids among these lithium compounds include the formate, oxalate, acetate, benzoate, acrylate, lactate, tartrate, citrate, salicylate, alginate, pyruvate, glyoxylate, nicotinate, and picolinate. Other usable examples of the lithium compound include lithium silicate, lithium aluminate, lithium methylate, and lithium ethylate. Also usable are minerals containing lithium together with at least one of magnesium, calcium, silicon, and aluminum, such as spodumene ($LiAlSi_2O_6$) and petalite ($Li[AlSi_4O_{10}]$).

In the present invention, suitability for sintering can be improved by incorporating a given amount of a lithium compound as one of sintering aids. Consequently, even when burning is conducted, for example, at 1,520° C., which is lower by about 100° C. than ordinary burning temperatures, a dense alumina-based sintered material can be obtained which has a relative density of 96% or higher, preferably 97% or higher. Furthermore, an alumina-based sintered material having a $Q_u$ as high as at least 6,000, preferably at least 6,600, more preferably at least 7,000, most preferably at least 7,500, can be obtained because the sintered material has a low lithium component content and a high $Al_2O_3$ content. Even when burning is conducted at a temperature as low as 1,520° C., a sintered material having a $Q_u$ as high as at least 6,000, preferably at least 6,600, can be obtained.

EXAMPLE

The present invention will be explained below in detail by reference to Examples.

(1) Investigation on Lithium Component (i) Preparation of Cylindrical Samples

An $Al_2O_3$ powder (purity: $\geq 99.9\%$) was mixed with sintering aids consisting of $MgCO_3$, $CaCO_3$, and $SiO_2$ powders and of a powder of one of $Li_2CO_3$, $TiO_2$, and $H_3BO_3$ (purity of each sintering aid: $\geq 99.9\%$) in each of the proportions shown in Tables 1 and 2.

The $Al_2O_3$ powder having a purity of 99.9% or higher contained impurities in a total amount of about 800 ppm, including CaO (200 ppm) and $SiO_2$ (500 ppm). The incorporation amounts of $MgCO_3$, $CaCO_3$, $Li_2CO_3$, and $H_3BO_3$ shown in Tables 1 and 2 each is given in terms of oxide amount. The amounts of the impurities such as CaO and $SiO_2$ contained in the $Al_2O_3$ powder are included in those of the respective ingredients shown in Tables 1 and 2.

Appropriate amounts of an organic binder and water were added to each of the powder mixtures. Each resultant mixture was treated with a ball mill at 90 rpm for 16 hours using 20-mm$\phi$ alumina balls, and then granulated with a spray dryer. The granulated starting materials each was formed by isostatic pressing to obtain cylindrical compacts having a diameter of 19 mm and a thickness of 11 mm. The pressing pressure was 1,000 kg/cm$^2$. Subsequently, these compacts were burned by holding the same at a temperature of 1,520° C. or 1,620° C. for 2 hours in the air. Thereafter, the circumferential surface and both sides of each resultant sintered material were ground. Thus, cylindrical samples having dimensions of about 16 mm($\phi$) by 8 mm(t) were obtained.

(ii) Evaluation of Sintered material Properties

The cylindrical samples obtained in (i) above were examined for $Q_u$ by the parallel conductor type dielectric cylindrical resonator method ($TM_{011}$ MODE). The resonance frequency used for the $Q_u$ measurement was 7.5 GHz. The same sintered materials were examined for density by the Archimedes' method to calculate the relative densities thereof using the following equation. Furthermore, the sintered materials were subjected to elemental analysis to determine the lithium contents (in terms of oxide amount) thereof. The results for Examples are given in Table 1, while those for Comparative Examples are given in Table 2.

Relative density (%) = [(density of sintered material)/(theoretical density)]×100

TABLE 1

| | | Powder composition (wt %) | | | | Burning temperature: 1520° C. | | | | Burning temperature: 1620° C. | | | |
| --- | --- | --- | --- | --- | --- | --- | --- | --- | --- | --- | --- | --- | --- |
| | | $Al_2O_3$ | MgO | CaO | $SiO_2$ | $Li_2O$, etc. | Relative density (%) | $Q_u$ | $Li_2O$ content (wt %) | Thermal conductivity (W/m · K) | Relative density (%) | $Q_u$ | $Li_2O$ content (wt %) | Thermal conductivity (W/m · K) |
| Example | 1 | 99.695 | 0.048 | 0.066 | 0.186 | 0.005 | 96.8 | 6270 | 0.002 | 28 | 98.8 | 7520 | 0.002 | 33 |
| | 2 | 99.690 | | | | 0.01 | 97.1 | 6970 | 0.004 | 31 | 98.7 | 7580 | 0.003 | 33 |
| | 3 | 99.780 | 0.032 | 0.044 | 0.124 | 0.02 | 97.0 | 7010 | 0.008 | 32 | 98.4 | 7720 | 0.007 | 35 |
| | 4 | 99.680 | 0.048 | 0.066 | 0.186 | 0.02 | 97.3 | 7080 | 0.008 | 30 | 98.2 | 7840 | 0.007 | 32 |
| | 5 | 99.530 | 0.072 | 0.099 | 0.279 | 0.02 | 97.5 | 6320 | 0.008 | 29 | 97.9 | 7320 | 0.007 | 31 |
| | 6 | 99.650 | 0.048 | 0.066 | 0.186 | 0.05 | 97.2 | 6700 | 0.018 | 30 | 97.7 | 7570 | 0.016 | 32 |
| | 7 | 99.600 | | | | 0.10 | 97.0 | 6680 | 0.038 | 29 | 96.2 | 7440 | 0.035 | 30 |

TABLE 2

| | | Powder composition (wt %) | | | | Burning temperature: 1520° C. | | | | Burning temperature: 1620° C. | | | |
| --- | --- | --- | --- | --- | --- | --- | --- | --- | --- | --- | --- | --- | --- |
| | | $Al_2O_3$ | MgO | CaO | $SiO_2$ | $Li_2O$, etc. | Relative density (%) | $Q_u$ | $Li_2O$ content (wt %) | Thermal conductivity (W/m · K) | Relative density (%) | $Q_u$ | $Li_2O$ content (wt %) | Thermal conductivity (W/m · K) |
| Comparative Example | 1 | 99.698 | 0.048 | 0.066 | 0.186 | 0.002 | 96.0 | 5680 | <0.001 | 25 | 98.8 | 6520 | <0.001 | 13 |
| | 2 | 99.695 | | | | 0.0045 | 96.3 | 5890 | 0.0016 | 26 | 98.8 | 6740 | 0.0016 | 33 |
| | 3 | 99.577 | | | | 0.123 | 95.8 | 5710 | 0.043 | 22 | 96.0 | 6210 | 0.041 | 27 |
| | 4 | 99.500 | | | | 0.20 | 95.8 | 5550 | 0.076 | 20 | 96.0 | 5980 | 0.074 | 26 |
| | 5 | 99.700 | | | | — | 95.9 | 5730 | — | 24 | 98.8 | 6540 | — | 34 |

TABLE 2-continued

| | Powder composition (wt %) | | | | | Burning temperature: 1520° C. | | | | Burning temperature: 1620° C. | | | |
|---|---|---|---|---|---|---|---|---|---|---|---|---|---|
| | $Al_2O_3$ | MgO | CaO | $SiO_2$ | $Li_2O$, etc. etc. | Relative density (%) | $Q_u$ | $Li_2O$ content (wt. %) | Thermal conductivity (W/m · K) | Relative density (%) | $Q_u$ | $Li_2O$ content (wt %) | Thermal conductivity (W/m · K) |
| 6 | 99.680 | | | | $TiO_2$ 0.02 | 97.9 | 5040 | — | 30 | 98.3 | 5440 | — | 31 |
| 7 | 99.680 | | | | $B_2O_3$ 0.02 | 97.4 | 5770 | — | 30 | 98.2 | 5960 | — | 31 |

The results given in Table 1 show that in Examples 1 to 7, which were within the scope of the first and sixth embodiments, the compacts showed improved suitability for sintering even when burning was conducted at 1,520° C., which is lower by 100° C. than the ordinary burning temperature. As a result, alumina-based sintered materials having excellent properties were obtained which had a relative density of about 97% or higher and a $Q_u$ exceeding 6,000. It can hence be seen that by incorporating a given amount of a lithium component as in the above, the burning temperature for obtaining sintered materials to be used as resonator-supporting bases, which are required to have a $Q_u$ of 6,000 or higher, could be lowered by at least about 100° C. In Example 3, in which the total amount of the magnesium component and the other minor components was on the lower limit specified in the third embodiment, sintered materials having a higher $Q_u$ were obtained. In Example 5, in which the total amount of the magnesium component and the other minor components was close to the upper limit specified in the third embodiment, sintered materials sufficiently suitable for practical use were obtained although they had a slightly lower $Q_u$ than those obtained in the other Examples.

On the other hand, the results given in Table 2 show the following. In Comparative Example 1, in which the content of the lithium compound incorporated as a sintering aid and the lithium component content in the sintered material were considerably lower than the respective lower limits specified in the sixth and first embodiments, neither suitability for sintering nor $Q_u$ was improved as compared with Comparative Example 5, in which the sintered materials contained no lithium component. Also in Comparative Example 2, in which the contents thereof were slightly lower than the respective lower limits specified in the sixth and first embodiments, $Q_u$ was improved only slightly. In Comparative Examples 3 and 4, in which the contents thereof were slightly higher and considerably higher, respectively, than the respective upper limits, both suitability for sintering and $Q_u$ were reduced even as compared with Comparative Example 5, in which the sintered materials contained no lithium component. In Comparative Example 6, in which a titanium ingredient was used as a sintering aid in place of the lithium ingredient, the sintered materials had a considerably lower $Q_u$ than those obtained in Comparative Example 5. In Comparative Example 7, in which a boron ingredient was used, $Q_u$ was not improved.

(2) Investigation on Sodium Component $Al_2O_3$ powders having sodium component contents ranging from 0.015 to 0.120 wt % in terms of oxide amount were used. Each of these alumina powders was mixed in an amount of 99.68 wt % with sintering aids consisting of 0.048 wt % MgO powder, 0.066 wt % CaO powder, 0.186wt % $SiO_2$ powder, and 0.02 wt % $LiO_2$ powder, and burning was conducted at a temperature of 1,600° C. for 2 hours. Except these, cylindrical samples were obtained in the same manner as in (1) (i). The sodium component content of each sample obtained was determined by elemental analysis, and the $Q_u$ thereof was determined in the same manner as in (1) (ii). The results obtained are shown in Table 3.

TABLE 3

| | | Sodium component content in $Al_2O_3$ powder (oxide amount, wt %) | $Na_2O$ content in sintered material (wt %) | $Q_u$ |
|---|---|---|---|---|
| Example | 8 | 0.031 | 0.026 | 7400 |
| | 9 | 0.048 | 0.035 | 6530 |
| | 10 | 0.065 | 0.047 | 6210 |
| | 11 | 0.015 | <0.010 | 8130 |
| Comparative Example | 8 | 0.073 | 0.051 | 5110 |
| | 9 | 0.120 | 0.083 | 4670 |

The results given in Table 3 show that sintered materials having a $Q_u$ of 6,000 or higher could be obtained by regulating the sintered materials so as to have a sodium component content not higher than 0.047% by weight. The results further show that such a reduced sodium component content could be attained by using as a starting material an $Al_2O_3$ powder having a sodium component content reduced to 0.065% by weight or lower. Furthermore, the results show that $Q_u$ became higher as the sodium component content in the $Al_2O_3$ powders and in the sintered materials in the Examples and Comparative Examples decreased (i.e., in the order of Comparative Examples 9 and 8 and Examples 10, 9, 8, and 11). In particular, the sintered material obtained in Example 11, in which the sodium component content was extremely low, had a $Q_u$ of 8,130. This supports that the use of an $Al_2O_3$ powder containing no sodium component or the production of a sintered material containing no sodium component, as in the fifth and eighth embodiments, results in an exceedingly high value of $Q_u$.

Besides the specific embodiments of the present invention described above, various changes can be made therein according to purposes or applications without departing from the scope of the invention. For example, various burning conditions, e.g., burning temperatures, can be selected. Besides magnesium, calcium, silicon, and lithium compounds, other compounds may be used as sintering aids. Furthermore, the sintered material may contain components other than the magnesium, calcium, silicon, and lithium components.

(3) An Example of Dielectric Resonator Prepared by Using the Alumina-based Sintered Material as A Support Material The alumina-base sintered material of the present invention may be used as a supporting member in a dielectric resonator described in U.S. Pat. Nos. 5,136,270 and 5,097,238 hereby incorporated by reference.

FIG. 1 illustrate an example of a dielectric resonator comprising resonator body 2 and supporting member 1. The reference numeral 3 represents a metal casing. The reference numerals D and L represents a diameter and a height of the metal casing.

When a resonator body comprising a dielectric material having an $\in r$ of 45, an Ag plated casing (D=97.3 mm, L=81.3 mm) and a supporting member made of the alumina-based sintered material of Example 1 or Comparative Example 5 were used, the unloaded Q value ($Q_0$) in case of the alumina-based sintered material of Example 1 was about 25,000 while that in case of the alumina-based sintered material of Comparative Example 5 was about 22,000 (resonant frequency: 900 MHz). In this case, the electrical characteristics of the supporting materials were as follows.

| Support Material | $\in r$ | tan δ | Measured frequency |
|---|---|---|---|
| Comparative Example 5 | 9.2 | $3.0 \times 10^{-4}$ | 10 GHz |
| Example 1 | 9.8 | $1.1 \times 10^{-4}$ | 10 GHz |

According to the invention as described in the first embodiment, an alumina-based sintered material especially useful as a supporting base for fixing a resonator main body therethrough to a metal casing to fabricate a porcelain dielectric resonator can be obtained by incorporating a specific amount of a lithium ingredient together with magnesium, calcium, and silicon ingredients into $Al_2O_3$. In particular, an even higher $Q_u$ and excellent thermal conductivity can be imparted to the alumina-based sintered material by regulating the $Al_2O_3$ content thereof to a value within the range specified in the third embodiment and further regulating the sodium component content thereof to a value within the range specified in the fourth embodiment. According to the invention as described in the sixth embodiment, the above specific alumina-based sintered material can be easily obtained by using a specific amount of a lithium compound as a sintering aid in combination with a magnesium compound and other compounds.

What is claimed is:

1. An alumina-based sintered material comprising a magnesium component, a calcium component, a silicon component, and a lithium component, wherein the amount of $Al_2O_3$ is from 99.5 to 99.8% by weight and the content of the lithium component in terms of oxide amount is from 0.002 to 0.04% by weight based on the alumina-based sintered material.

2. The alumina-based sintered material according to claim 1, wherein the amount of the lithium component is from 30 to 40% by weight in terms of oxide amount based on the lithium compound which has been incorporated as a sintering aid.

3. The alumina-based sintered material according to claim 1, wherein the total amount of the magnesium, calcium, silicon, and lithium components in terms of oxide amount is from 0.2 to 0.5% by weight, both based on the alumina-based sintered material.

4. The alumina-based sintered material according to claim 1, which has a sodium component content of up to 0.05% by weight in terms of oxide amount based on the alumina-based sintered material.

5. The alumina-based sintered material according to claim 1, which contains no sodium component.

6. A process for producing an alumina-based sintered material, wherein the amount of $Al_2O_3$ is from 99.5 to 99.8% by weight, which comprises using $Al_2O_3$ powder and powdery compounds of magnesium, calcium, silicon, and lithium as sintering aids, wherein the amount of the lithium compound powder in terms of oxide amount is from 0.005 to 0.1% by weight based on the total amount of the $Al_2O_3$ powder and the sintering aids in terms of oxide amount.

7. The process for producing an alumina-based sintered material according to claim 6, wherein the $Al_2O_3$ powder has a sodium component content of up to 0.07% by weight in terms of oxide amount.

8. The process for producing an alumina-based sintered material according to claim 6, wherein the $Al_2O_3$ powder contains no sodium component.

9. The process for producing an alumina-based sintered material according to claim 6, wherein the lithium compound is at least one selected from the oxide, hydroxide, and carbonate of lithium and water-soluble lithium salts of organic acids.

10. A dielectric resonator comprising a resonator body and a supporting member comprising an alumina-based sintered material, wherein the amount of $Al_2O_3$ is from 99.5 to 99.8% by weight, said alumina-based sintered material comprising a magnesium component, a calcium component, a silicon component, and a lithium component, wherein the content of the lithium component in terms of oxide amount is from 0.002 to 0.04% by weight based on the alumina-based sintered material.

* * * * *

UNITED STATES PATENT AND TRADEMARK OFFICE
CERTIFICATE OF CORRECTION

PATENT NO.    : 6,069,105
DATED         : May 30, 2000
INVENTOR(S)   : Yoshihiro YAMAMOTO et al It is certified that error(s) appears in the above-identified patent and that said Letters Patent is hereby corrected as shown below:

In column 2, at line 22, change "FIG. 1" to --The Figure--.

In column 9, at line 14, change "FIG. 1 illustrate" to --The Figure illustrates--.

Signed and Sealed this

Third Day of April, 2001

*Attest:*

NICHOLAS P. GODICI

*Attesting Officer*    *Acting Director of the United States Patent and Trademark Office*